United States Patent [19]
Frantom et al.

[11] Patent Number: 5,199,740
[45] Date of Patent: Apr. 6, 1993

[54] HYBRID INFLATOR FOR AIR BAG

[75] Inventors: Richard L. Frantom, Richmond; Klaus F. Ocker; Robert M. Kremer, both of Fraser; William E. Rogerson, Rochester Hills; William D. Gaw, Jr., Clawson, all of Mich.; Roy G. Brown, Hot Springs, Ark.; Teresa L. Bazel, Annadale, Va.; Donald W. Renfroe, Haymarket, Va.; Charles D. Woods, Gainesville, Va.; Robert J. Bishop, Washington, Mich.

[73] Assignee: Bendix Atlantic Inflator Co., Sterling Heights, Mich.

[21] Appl. No.: 713,189

[22] Filed: Jun. 10, 1991

[51] Int. Cl.⁵ .................................. B60R 21/26
[52] U.S. Cl. ......................... 280/736; 280/741
[58] Field of Search ............... 280/736, 737, 740, 741, 280/742

[56] References Cited

U.S. PATENT DOCUMENTS

| | | | |
|---|---|---|---|
| 3,723,205 | 3/1973 | Scheffee | 280/741 |
| 3,756,621 | 9/1973 | Lewis et al. | 280/741 |
| 3,891,233 | 6/1975 | Damon | 280/737 |
| 3,895,821 | 7/1975 | Schotthoefer et al. | 280/741 |
| 3,901,530 | 8/1975 | Radke | 280/741 |

FOREIGN PATENT DOCUMENTS 2443267  3/1975  Fed. Rep. of Germany ...... 280/741

*Primary Examiner*—David M. Mitchell
*Assistant Examiner*—Tamara L. Graysay

[57] ABSTRACT

A device (20) for inflating an air bag (37) comprising: a pressure vessel (34) formed by a vessel part (22) and a generator body assembly (30). The generator body assembly is received within opposing openings (24, 26) in the vessel part (22) and secured thereto to provide a gas tight seal (28). The generator body assembly (30) includes: a first bore (38) to receive a quantity of propellant (150) and initiator assembly (120) to cause the propellant (150) to burn in response to a control signal indicative of a vehicle crash. Various passages are provided in the gas generator assembly and oriented to permit the products of combustion of the burning propellant to impinge on inner walls of the pressure vessel to reduce particulate emission.

8 Claims, 2 Drawing Sheets

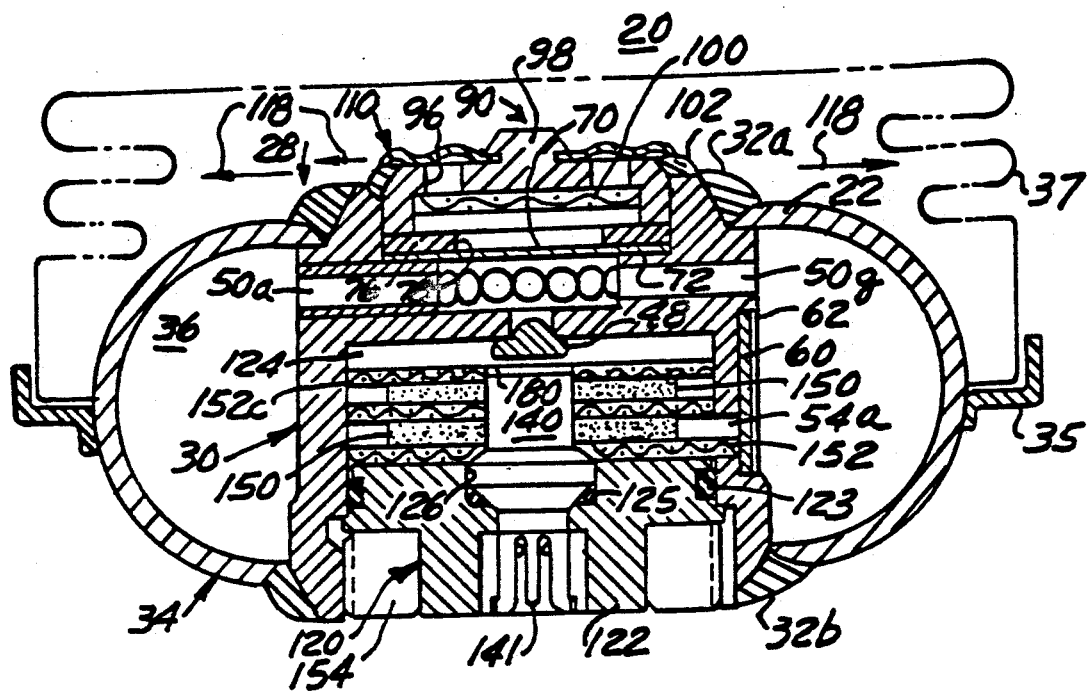
FIG. 1
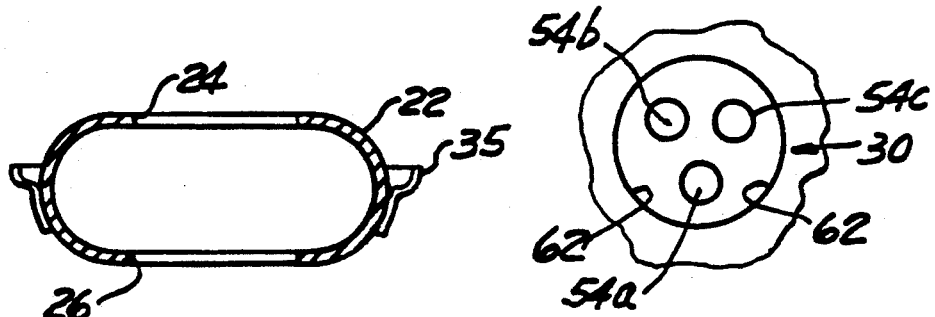
FIG. 3
FIG. 2
FIG. 4

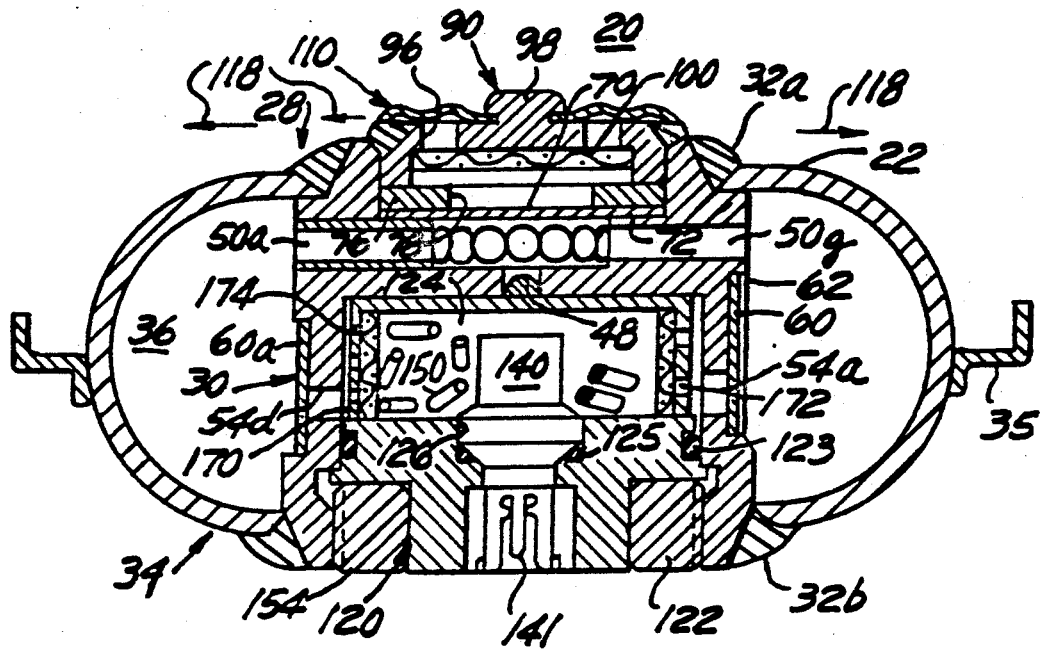
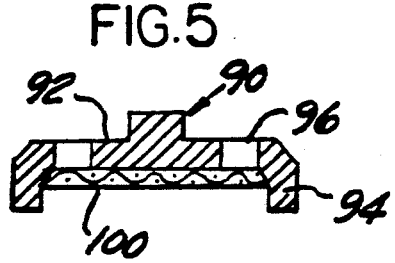
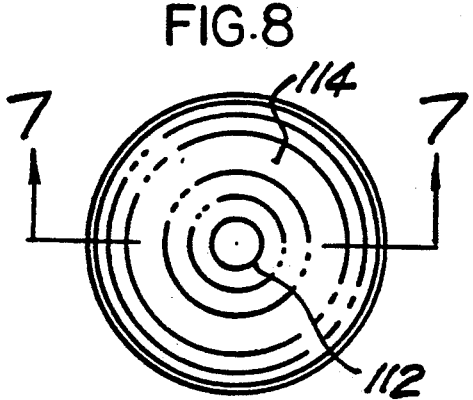
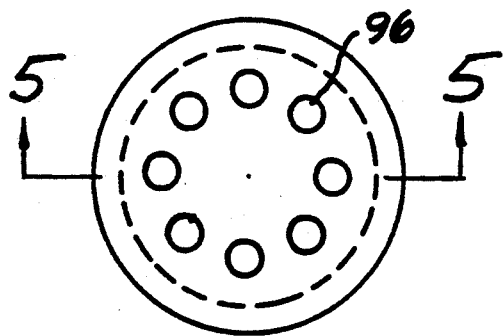

5,199,740

HYBRID INFLATOR FOR AIR BAG

BACKGROUND AND SUMMARY OF THE INVENTION

The present application generally relates to a hybrid inflator which is used to inflate an air bag.

Inflatable bag restraint systems have been shown to reduce the seriousness of injuries and number of fatalities resulting in motor vehicle accidents. There exists a number of means for inflating an air cushion or air bag such as utilizing a quantity of stored gas which is selectively released to expand the air bag. Alternatively, a gas source derived from a gas generating material propellant such as sodium azide, which upon ignition thereof generates a sufficient quantity of gas to expand the air bag. Another type of gas source results from a combination of the stored compressed gas and a gas generating or enhancing material. This last device is often referred to as an augmented gas or hybrid inflator. Various hybrid inflators have been shown in the past such as those illustrated in U.S. Pat. Nos. 3,756,621 and 3,895,821. The inflator shown in U.S. Pat. No. 3,756,621 uses a separate squib or initiator to ignite the propellant and an actuator to open an exit passage to initiate compressed gas flow. U.S. Pat. No. 3,895,821 mounted a single squib outside the pressurized environment of the pressure vessel to ignite the propellant.

U.S. Pat. Nos. 3,891,233 and 3,901,530 illustrate what is called a driver side air bag inflator. With reference to U.S. Pat. No. 3,901,530 there is illustrated a hybrid inflator which utilizes an initiator and a quantity of propellant. This inflator includes a plurality of burst disks which are opened initially by the high temperature produced by the burning initiator and propellant. One disadvantage of this prior art inflator is that the products of combustion are transferred directly into the air bag. Another disadvantage is that during the initial inflation of the air bag very hot gases are produced. As is often the case, the burn time of a propellant is less than the total discharge time of the stored gas and as such, the initial hot inflation gases are followed by the remaining cooler gas stored in the inflator. In contrast, the present invention will improve the heat transfer process between the initiator, propellant and stored gas to yield a more uniformly heated quantity of inflation gas. Further, as will be seen from the description below, the present invention will cause an outlet burst disk to open primarily due to the overpressurization of the stored inflation gas. This overpressurization is achieved by heating the stored gas by products of combustion of the burning propellant. In this manner, the inflation gases initially communicated to the air bag are cooler than those developed in the prior art, thereby minimizing damage to the air bag, the air bag cover, and related mounting hardware. These deficiencies are avoided in the present invention.

It is an object of the present invention to provide an improved hybrid inflator. A further object of the present invention is to provide a hybrid inflator in which certain products of combustion become plated on the internal walls of a pressure vessel thereby lessening particulate emission.

Accordingly, the invention comprises: a device for inflating an air bag comprising: a pressure vessel formed by a vessel part and a generator body assembly. The generator body assembly is received within opposing openings in the vessel part (22) and secured thereto to provide a gas tight seal. The generator body assembly includes: a first bore to receive a quantity of propellant and initiator assembly means to cause the propellant to burn in response to a control signal indicative of a vehicle crash. The generator body assembly further includes at least one radial passage directed toward an internal wall of the pressure vessel such that some of the products of combustion of the burning propellant will impinge thereon and plate thereto. A first burst disk is provided to seal the at least one radial passage and pressure vessel. The first burst disk is opened by the products of combustion permitting same to flow into the pressure vessel and heat the gas stored therein. The gas generator assembly also includes a plurality of flow passages communicating with the pressure vessel to an outlet passage, and a outlet burst disk disposed relative to exit ends of the flow passages and to an outlet passage to provide a gas tight seal. The outlet seal is ruptured as a result of increased gas pressure in the pressure vessel (34) resulting from heating due to the burning of the propellant.

Many other objects and purposes of the invention will be clear from the following detailed description of the drawings.

BRIEF DESCRIPTION OF THE DRAWINGS

In the drawings:

FIG. 1 illustrates a cross-sectional view of an assembled hybrid inflator incorporating the teachings of the present invention.

FIG. 2 illustrates a cross-sectional plan view of a vessel part.

FIG. 3 illustrates a partial sectional view of the hybrid inflator.

FIG. 4 illustrates a plan view of a plurality of flow passages formed within the hybrid inflator.

FIGS. 5 and 6 illustrates an isolated view of a manifold.

FIGS. 7 and 8 illustrate various views of a diffuser plate.

FIG. 9 illustrates an alternate embodiment of the invention.

DETAILED DESCRIPTION OF THE DRAWINGS

Reference is made to FIGS. 1-2 which illustrate various features of a hybrid inflator 20. The inflator 20 can be mounted to the central hub of a steering wheel in a known manner to protect the driver of a vehicle. The hybrid inflator comprises a generally toroidal shaped vessel part 22 having first and second openings 24 and 26. These openings 24 and 26 are generally opposingly positioned. In addition, the openings 24 and 26 are tapered outwardly permitting a more effective weld, as described below. Fitted within the vessel part 22 is a generator body assembly generally shown as 30. The generator body assembly 30 is joined to the vessel part 22 proximate the first and second openings 24 and 26 to define a gas tight seal therebetween. The gas tight seal 28 is accomplished by welding the generator body assembly 30 to the vessel part 22 about the openings 24 and 26. The resulting circumferential welds are shown as 32a and 32b. The generator body assembly 30 and vessel part 22 cooperate to define a pressure vessel 34 into which will be stored a gas generally shown as 36 such as Argon under a predetermined pressure. Depending upon the size of the air bag to be inflated, this internal pressure may vary between 2,000-4,000 psi. The stored gas may also include a small quantity (2%) of helium used in a leak sensing process. Positioned about and secured to the pressure vessel is a bracket 35. This bracket 35 may include mounting holes (not shown) for attachment to the steering wheel. An air bag 37 is attached to the bracket and stored in a folded orientation prior to its inflation. A cover (not shown) is typically provided to protect the folded air bag 37.

Reference is made to FIG. 3 which illustrates a cross-sectional view of the inflator 20 and more clearly shows the details of the generator body assembly 30. The generator body assembly 30 includes a cylindrical walled body 37 having a first or lower bore 38 and an outlet or upper bore 40. These bores 38 and 40 are generally coaxially situated relative to the first and second openings 24 and 26, respectively. Situated at the top of the first bore 38 is a gas inlet passage 42 which is sealed by a gas inlet seal 48. The gas inlet seal 48 is welded in place after the pressurized inflation gas 36 has been placed within the pressure vessel 34. The generator body assembly 30 further includes a plurality of radial passages 50a-g which extend outwardly from the narrow portion 52 of the stepped bore 40. Two such passages 50a and 50g are shown in cross-section while the ends of the remaining passages can only be seen in FIG. 3. In addition, a plurality of pressure passages 54a-c extend through the cylindrical wall body 37. One such passage 54a can be seen in FIG. 3. These passages 54a-c communicate to a generator or first burst disk 60 received within and secured to a second bore 62. The relationship of the second bore 62 to the passages 54a-c can be seen in FIG. 4. The second bore 62 is fabricated on the outward facing side of the generator body assembly 30 and faces the inside of the pressure vessel 34. The first burst disk 60 is typically edged welded to the bore 62.

The hybrid inflator 20 further includes an outlet or second burst disk 70 disposed and secured to the step portion 72 of the stepped bore. As can be seen from the above figures, the step portion 72 is situated between the narrow diameter portion 52 and a larger diameter portion 74 defining the stepped bore 40.

Returning to FIG. 1, a washer 76 is received within the larger portion 74 of the stepped bore. The washer 76 includes a central opening 78 having a diameter that is typically smaller than the diameter of the narrow portion 52 of the stepped bore 40. As can be seen from the above figures, the washer 76 rests upon the outer portions of the second burst disk 70 providing a defined diameter for the rupture disk opening. Also inserted within the larger diameter portion 74 of the stepped bore 40 is a manifold generally shown as 90. The manifold will be welded to adjacent portions of the generator body assembly 30. The manifold is also shown in FIGS. 5 and 6. The manifold 90 includes a central plate 92 and a downwardly extending circumferential wall 94. The plate includes a plurality of exit openings 96 and an outwardly extending boss 98. A manifold screen 100 is positioned on the underside of the plate 92, the purpose of which is to filter any burst disk material that may be in the inflation gas prior to communicating same to the air bag. The manifold screen 100 is also shown in FIG. 1.

Secured to the manifold 90 is a diffuser 110 shown in FIGS. 7 and 8. The diffuser includes a central opening 112 which is received over and secured to the boss 98. More specifically, it is envisioned that the material forming the boss 98 will be subsequently formed to a rivet head construction thereby securing the diffuser 110 to the manifold 90. The diffuser 110 includes a flexible plate 114 which includes a plurality of ribs 116 which add a degree of stiffness. With the diffuser 110 secured in place, the diffuser plate 114 covers the exit openings 96 formed within the manifold 90. As the stored, pressurized gas exits the manifold openings 96, the outrush of this gas causes the flexible plate 114 to move away from the manifold. The diffuser generally directs the inflation gas to flow radially outward providing a thrust neutral condition. In this manner the inflation gases are initially directed away from the vehicle occupant.

Returning to FIG. 1, the hybrid inflator 20 further includes an initiator housing assembly 120. The initiator housing assembly 120 includes a housing 122 received within the first bore 38. The housing 122 includes an initiator receiving bore 126 into which is received an initiator or squib 140 of known construction. The initiator 140 upon activation by a control signal produces an intense flame to cause a quantity of propellant to begin to burn. The initiator housing 122 is sealed to the generator body assembly and initiator 140 by O-rings 123 and 125. As can be seen from the above drawings, the initiator housing assembly 120 and the gas generator assembly 30 cooperate to define a propellant cavity 124 therebetween. Positioned within this cavity is a quantity of propellant 150 such as Arcite as disclosed in U.S. Pat. No. 3,723,205.

In the embodiment of the invention shown in FIG. 1, a first screen 152 is placed on the initiator housing 122. Two wafers of typically extruded propellant 150 and an additional plurality of screens 152b and 152c are also placed within the propellant cavity. A threaded retainer 154 is used to secure the initiator housing 122 including the propellant and screens to the generator body assembly 30.

With reference to FIG. 9, there is shown an alternate embodiment of the present invention. As can be seen, the general construction of the inflator 20 shown therein is substantially identical to the inflator shown in FIG. 1. In the embodiment shown in FIG. 9, the propellant 150 is extruded to take the form of short, solid cylinders or cylindrical tubes which are placed uniformly or randomly within a propellant cup 170. The cup includes a plurality of perforations 172. As can be appreciated, the cup provides a means for retaining the propellant and the perforations function as flow passages to allow reaction products to freely exit the generator body assembly. An optional screen such as 174 can be inserted within the cup 170 to enhance ignition of all surfaces of the propellant. In addition, as can be seen in FIG. 9, an additional set of pressure passages 54d-f are fabricated within the cylindrical walled body 37 and enclosed by an additional burst disk 60a.

The following is a brief description of the operation of the present invention. In response to a signal indicative of a vehicle crash, a control signal is communicated to the initiator 140 which is activated. Upon activation, the initiator 140 produces an intense flame causing the propellant 150 to begin to burn. As the propellant burns, the pressure within the propellant cavity 124 will substantially increase to a level that will cause the burst disk 60a to rupture or open thereby communicating the products of combustion into the pressure vessel 34. These products of combustion will include heat, a small quantity of gas produced by the propellant 150, as well as some particulate matter which may include molten potassium chloride which is generated as the propellant 150 burns. Upon opening the ruptured disk 60a, these products of combustion will forcibly flow through the pressure passages 54a–c (and 54d–f if included). As can be appreciated, the hot potassium chloride as well as other constituents in the heated gases produced by the burning of the propellant, will enter the pressure vessel 34 and impinge upon the inside wall of the vessel part 22. As the pressure vessel 34 is substantially cooler than the temperature of the products of combustion, the potassium chloride, upon impacting the vessel part 22, will adhere or plate upon the interior wall of the pressure vessel 34, thereby diminishing the quantity of potassium chloride entering the air bag. As the heated products of combustion enter the pressure vessel, the temperature of the pressurized Argon gas will increase rather uniformly. As the temperature of the Argon gas increases, its pressure will increase to a level which will rupture the outlet burst disk 70 disposed in the stepped bore 40 thereby permitting the gases to flow through the exit openings 96 in the manifold 90. The flow of these gases impacts the diffuser plate 114, lifting same from the manifold. Thereafter, the inflation gases enter the air bag to inflate same.

Many changes and modifications in the above described embodiment of the invention can, of course, be carried out without departing from the scope thereof. Accordingly, that scope is intended to be limited only by the scope of the appended claims.

We claim:

1. A device (20) for inflating an air bag (37) comprising:
    a pressure vessel (34) formed by a vessel part (22) and a generator body assembly (30), the generator body assembly received within opposing openings (24, 26) in the vessel part (22) and secured thereto to provide a gas tight seal (28),
    the generator body assembly (30) includes:
        a first bore (38) to receive a quantity of propellant (150) and initiator assembly means (120) to cause the propellant (150) to burn in response to a control signal indicative of a vehicle crash;
        at least one radial passage (54a–c, 54d–f) directed toward an internal wall of the pressure vessel (34) such that some of the products of combustion of the burning propellant will impinge thereon and plate thereto;
        a first burst disk (60) sealing the at least one radial passage and pressure vessel, the first burst disk (60) opened by the products of combustion permitting same to flow into the pressure vessel (34) and heat gas stored therein;
        a plurality of flow passages (50) communicating with the pressure vessel (34) to an outlet passage (40);
        an outlet burst disk (70) disposed relative to exit ends of the flow passages and to the outlet passage (40) to provide a gas tight seal, the outlet burst disk ruptured as a result of at least increased gas pressure in the pressure vessel (34) resulting from heating due to the burning of the propellant.

2. The device as defined in claim 1 including a manifold (90) secured to the gas generator body (30) downstream of the outlet burst disk (70) including a plurality of exit passages (96) therethrough;
diffuser means (100) secured to the manifold (90) for covering the exit passages and for moving away from the exit passages as a result of the flow of pressurized gas from the pressure vessel (34) and for directing such gases to flow in a thrust neutral manner into the air bag.

3. The device as defined in claim 1 wherein the propellant (150) is formed into a plurality of washer shaped structures.

4. The device as defined in claim 1 including screen means (152, 170) to enhance ignition of all surfaces of the propellant prior to entry into the pressure vessel.

5. The device as defined in claim 1 wherein the propellant is formed as short cylinders packaged within the generator body.

6. The device as defined in claim 1 including a gas inlet passage (42) communicating the first bore (38) to the plurality of flow passages (50) into which gas, under pressure, enters the pressure vessel (34) to fill the pressure vessel, and
    a seal (48) to seal the gas inlet passage (42).

7. The device as defined in claim 1 including a bracket about the pressure vessel and wherein the air bag is attached to the bracket.

8. A device (20) for protecting a passenger of a vehicle comprising:
    a toroidal shaped vessel part (22) having a first (24) and second (26) opening therein;
    a generator body assembly (30) received in the first and second openings (24, 25) and joined to vessel part (22) to provide a gas tight seal therebetween, the generator body assembly and vessel part cooperating to define a pressure vessel (34) for the storage of gas (36) under pressure.
    the generator body assembly (30) including:
        a cylindrical body (37), a first bore (38) and an opposing stepped bore (40) defining an outlet passage, generally coaxially disposed relative to the first and second openings;
        a gas inlet passage (42) situated below the stepped bore sealed at one end (44) after the gas has been placed into the pressure vessel (34) by a gas inlet seal (48);
        a plurality of radial passages (50a–g) extending outwardly from a narrow diameter portion (52) of the stepped bore (40) to communicate the pressure vessel with the stepped bore (40),
        a plurality of pressure passages (54a–c) extending radially through the cylindrical body wall (57), one end (58) of each enclosed by a first burst disk (60) received within and secured to a second bore (62), the second bore (62) facing the inside of the pressure vessel (34),
        a second burst disk (70) disposed and secured to the step (72) between the large diameter portion (74) and the narrow diameter portion (52) of the stepped bore (40),
        a washer (76) received in the large portion of the stepped bore (40), having an opening (78) smaller than the diameter of the narrow diameter portion (52) and overlaying the outer portions of the second burst disk (70),
        a manifold (90), received in the large diameter portion (74), including a plate (92) and downwardly extending circumferential wall (94), the plate including a plurality of exit openings (96), a boss (98) extending outwardly from the plate (92), a manifold screen (100) positioned on the underside of the plate (92), the manifold (90) secured to the generator body assembly (30), a diffuser (110) received over and secured to the boss (98), including a flexible plate (114), having an opening (112) to enclose the plate exit openings (96) and moveable outwardly therefrom as the storage gas exits these openings (96);

initiator housing assembly (120) comprising:

a housing (122) defining an initiator receiving bore (126), the initiator housing assembly received within the first bore (38), a quantity of propellant (130) received within a propellant retaining bore (124), an initiator (140) received within the initiator receiving bore to cause when activated the burning of the propellant (130), a retainer (150) received within the first bore (38) to secure the initiator housing assembly (120) to the generator body assembly (30).

* * * * *